(12) United States Patent
Orre et al.

(10) Patent No.: US 8,782,406 B2
(45) Date of Patent: Jul. 15, 2014

(54) SECURE DIGITAL COMMUNICATIONS

(75) Inventors: Anders Orre, Glumslöv (SE);
Subhashini Sreenivasan, Malmö (SE);
Niclas Lindberg, Åhus (SE); Ilio Virgili, Veberöd (SE)

(73) Assignee: DTS Steering Group AB, Malmo (SE)

( * ) Notice: Subject to any disclaimer, the term of this patent is extended or adjusted under 35 U.S.C. 154(b) by 498 days.

(21) Appl. No.: 13/002,549

(22) PCT Filed: Jul. 4, 2008

(86) PCT No.: PCT/EP2008/058681
§ 371 (c)(1),
(2), (4) Date: Feb. 28, 2011

(87) PCT Pub. No.: WO2010/000329
PCT Pub. Date: Jan. 7, 2010

(65) Prior Publication Data
US 2011/0154037 A1  Jun. 23, 2011

(51) Int. Cl.
*H04L 9/32* (2006.01)
(52) U.S. Cl.
USPC ........... 713/168; 713/169; 713/171; 713/175; 726/2; 726/5; 726/22
(58) Field of Classification Search
CPC .......................................................... H04I 9/32
USPC ....................... 713/168, 169, 170; 380/28, 30
See application file for complete search history.

(56) References Cited

U.S. PATENT DOCUMENTS

| 7,764,793 B2 * | 7/2010 | Qiu et al. ................. 380/255 |
| 2002/0007351 A1 * | 1/2002 | Hillegass et al. ............... 705/59 |
| 2003/0084291 A1 * | 5/2003 | Yamamoto et al. ........... 713/168 |

FOREIGN PATENT DOCUMENTS

EP  1 648 112 A1  4/2006

OTHER PUBLICATIONS http://www.itu.int/rec/T-REC-H.323-200011-S/en "H.323: Packet-based multimedia communication systems"—Nov. 2000, ITU.*
http://www.itu.int/rec/T-REC-H.323-199802-S/en "H.323: Packet-based multimedia communication systems"—Feb. 1998, ITU.*
"Packet-based multimedia communications systems; H.323 (Jul. 2003)", International Telecommunications Union (ITU), Jul. 14, 2003, XP017404819; p. 86, lines 1-21; figure 39 Section 7.1.3.
ITU; Packet-based multimedia communications system; H.323 (Jul. 2003), Telecommunications Standardization Sector of ITU, Jul. 2003, 274 pages.
Chinese First Office Acation, issued Mar. 5, 2013; Application No. 200880130137.1.

* cited by examiner

*Primary Examiner* — Randy Scott
(74) *Attorney, Agent, or Firm* — Ladas & Parry LLP (57) ABSTRACT

There is disclosed a method in a communications system for enabling authentication of a sender device and a receiver device in the communication system, wherein the sender device is associated with a self-generated first identity and a first master device, the receiver device is associated with a self-generated second identity and a second master device and wherein the authentication is enabled by utilizing the first master device and the second master device for the sender device and the receiver device to verify the identities of each other. In one embodiment, both the sender device and the receiver device are also associated with a third device ant the third device is used in addition to the master devices for verifying said identities. There is also disclosed a method In a sender device, a method in a receiver device, a method in a third device, a sender device, a receiver device, a third device, and a computer program product for the same.

5 Claims, 6 Drawing Sheets

SECURE DIGITAL COMMUNICATIONS

TECHNICAL FIELD

The present invention relates to digital communications system, and more particularly to methods and devices for enabling authentication in such a digital communications system.

BACKGROUND

The Internet has revolutionized the way business is done and has changed consumer behavior in a very short space of time. However, electronic commerce will only be able to realize its full potential if a number of important conditions are met. One of these conditions will be the underlying security of the data transported over the Internet, intranets and extranets.

Thus, there is an increasing demand for creating secure transfer of packages of information between sender devices and receiver devices in digital communications systems and networks. In areas such as digital business communication, digital money transactions, digital product delivery, etc., it is of importance that the package of information does not fall into the wrong hands, such as in the hands of an unauthorized party, or is tampered with by a participating party or by a third unauthorized party. It is also of importance that the sender and receiver can trust each other.

SUMMARY

In view of the above-mentioned and other drawbacks of the related art, it would be desirable to achieve an improved method for digital communication and, in particular, an improved method for digital communication in terms of improved security, authentication and/or traceability. Also, it would be advantageous to achieve a communication system comprising at least some of these advantages and/or improvements. In addition it would be advantageous to achieve a sender device and/or a receiver device enabling improved digital communication in terms improved security and/or authentication and/or traceability.

To better address one or more of these concerns, in a first aspect of the invention there is provided a method in a communications system. Hence there is provided a method in a communications system for authentication of a sender device and a receiver device in the communication system, wherein the method comprises creating, by the sender device, an identification of the sender device; creating, by the receiver device, an identification of the receiver device; sending, by the sender device, a request pertaining to establishing a relation between the sender device and the receiver device to the receiver device; sending, by the receiver device, at least an identification of a second master device to the sender device; sending, by the sender device, the identification of the second master device to a first master device; sending, from the first master device, a request pertaining to communication conditions needed by the sender device for the sender device to establish communication with the receiver device to the second master device; sending, from the second master device, the communication conditions to the first master device; in a case the sender device fulfills the communication conditions, providing, by the sender device, a first access key to the first master device; and providing, by the receiver device, a second access key to the second master device.

The disclosed method may provide for improved digital communication between a sender device and a receiver device since communication between a sender device and a receiver device may involve at least one additional communications device and wherein identification information pertaining to the sender device and the receiver device is communicated to the at least one additional communications device. By means of the at least one additional communications device which may be involved at some stage of the communications between the sender device and the receiver device the digital communication may thus be improved in terms of improved traceability. For the same reasons the digital communication may thus be improved in terms of improved security. For the same reasons the digital communication may thus be improved in terms of improved authentication. For the same reasons the digital communication may thus be improved in terms of improved access rights.

The request pertaining to establishing the relation between the sender device and a receiver device to the receiver device may comprise at least an identification of a first group of devices, and wherein the method may further comprise receiving, by the receiver device, the request; sending, by the receiver device, at least an identification of a second group of devices to the sender device; receiving, by the sender device, the identification of a second group; in a case there exists at least one third device, which is a device being one of the devices in both the first group and the second group of devices, sending, by the sender device, a request pertaining to a reference from the at least one third device regarding the receiver device; receiving, by the receiver device, the reference request and sending, by the receiver device, the request to the at least one third device; receiving, by the receiver device, the reference and sending, by the receiver device, the reference to the sender device; receiving, by the sender device, the reference; in response thereto; creating, by the sender device a first public encryption key for establishing communication from the sender device to the receiver device; encrypting, by the sender device, the reference using the first public encryption key; encrypting, by the sender device, the first public encryption key using an additional public encryption key; sending, by the sender device, the encrypted reference and the encrypted first public encryption key to the receiver device; sending, by the receiver device, the encrypted first public encryption key to the at least one third device; decrypting, by the, at least one third device, the encrypted first public encryption key; sending, by the at least one third device, the decrypted first public encryption key to the receiver device; decrypting, by the receiver device, the encrypted reference; validating, by the receiver device, the decrypted reference.

The system may further comprise a fourth device and a fifth device, and the sender device may be associated with the fourth device, the receiver device is associated with the fifth device and the fourth device is associated with the fifth device; and wherein in a case there does not exist at least one third device which is a device being one of the devices in both the first group and the second group of devices, the method may comprise sending, by the sender device, a request pertaining to a reference from the fifth device regarding the receiver device, wherein the request is sent to the receiver device; forwarding, by the receiver device, the request to the fifth device; sending, by the fifth device, the reference to the receiver device; forwarding, by the receiver device, the reference to the sender device; sending, by the sender device, the reference to the fourth device; validating, by the fourth device, the reference and sending, by the fourth device, the validated reference to the sender device; creating, by the sender device a first public encryption key for establishing communication from the sender device to the receiver device;

encrypting, by the sender device, the reference using the first public encryption key; encrypting, by the sender device, the first public encryption key using an additional public encryption key; sending, by the sender device, the encrypted reference and the encrypted first public encryption key to the receiver device sending, by the receiver device, the encrypted first public encryption key to the fourth device via the fifth device; decrypting, by the fourth device, the encrypted first public encryption key; sending, by the fourth device, the decrypted first public encryption key to the receiver device via the fifth device; decrypting, by the receiver device, the encrypted reference; validating by the receiver device, the decrypted reference.

According to a second aspect there is provided a method performed by a sender device for enabling authentication, the method comprising creating an identification of the sender device; sending a request pertaining to establishing a relation between the sender device and a receiver device to the receiver device, wherein the request comprises at least an identification of a first group of devices; receiving at least an identification of a second group of device from the receiver device; in a case there exists at least one common third device in the first group and the second group of devices, sending a request pertaining to a reference from the at least third device regarding the receiver device; receiving the reference from the receiver device; creating a first public encryption key for establishing communication from the sender device to the receiver device; encrypting the reference using the first public encryption key; encrypting the first public encryption key using an additional public encryption key; sending the encrypted reference and the encrypted first public encryption key to the receiver device.

The sender device may be associated with a fourth device, the receiver device may be associated with a fifth device and the fourth device may be associated with the fifth device; and wherein in a case there does not exist at least one common third device in the first group and the second group of devices, the method may further comprise sending a request pertaining to a reference from the fourth device regarding the receiver device; wherein the requesting may be forwarded from the fourth device to the fifth device; receiving the reference from the fourth device; creating a first public encryption key for establishing communication from the sender device to the receiver device; encrypting the reference using the first public encryption key; encrypting the first public encryption key using an additional public encryption key; sending the encrypted reference and the encrypted first public encryption key to the receiver device.

The reference may comprise a sequence number and the reference may pertain to identification of the receiver device as performed by the third device, and the reference may be associated with the sender device.

The first public encryption key may be arranged to be used by the sender device in future communication from the sender device to the receiver device.

The method may further comprise creating an additional public encryption key for establishing communication from the sender device to a second receiver device, wherein the additional public encryption key may be different from the first public encryption key.

The method may further comprise sending the request pertaining to establishing the relation between the sender device and the receiver device to a first auxiliary device; sending the request pertaining to the reference from the at least third device regarding the receiver device to the first auxiliary device; and sending the encrypted reference and the encrypted first public encryption key to the first auxiliary device.

The request pertaining to establishing the relation between the sender device and the receiver device, the request pertaining to the reference from the at least third device regarding the receiver device, and the encrypted reference and the encrypted first public encryption key may further comprise one digital signature, and the digital signature may be associated with the sender device.

According to a third aspect there is provided a method performed by a receiver device for enabling authentication, wherein the method comprises creating an identification of the receiver device; receiving a request pertaining to establishing a relation between the receiver device and a sender device from the sender device, wherein the request comprises at least an identification of a first group of devices; sending at least an identification of a second group of devices to the sender device; and in a case there exists at least one common third device in the first group and the second group of devices, sending a request pertaining to a reference from the at least third device regarding the receiver device; sending the reference to the sender device; receiving, by the receiver device, an encrypted reference and an encrypted first public encryption key; sending the encrypted first public encryption key to the at least one third device; receiving a decrypted first public encryption key; decrypting the encrypted reference; and validating the decrypted reference.

The sender device may be associated with a fourth device, the receiver device may be associated with a fifth device and the fourth device may be associated with the fifth device; and in a case there does not exist at least one common third device in the first group and the second group of devices, the method may further comprise sending a request pertaining to a reference from the fifth device regarding the receiver device; wherein the requesting is forwarded from the fourth device to, the fifth device; sending the reference to the fifth device; receiving an encrypted reference and an encrypted first public encryption key; sending the encrypted first public encryption key to the fourth device via the fifth device; receiving the decrypted first public encryption key; decrypting the encrypted reference; and validating the decrypted reference.

According to a fourth aspect there is provided a method performed by a third device for enabling authentication, wherein the method comprises creating an identification of the third device; receiving a reference request from the receiver device regarding the receiver device; sending, by the third device, the reference to the receiver device; receiving an encrypted first public encryption key; decrypting the encrypted first public encryption key; and sending the decrypted first public encryption key to the receiver device.

The reference may pertain to identification of the receiver device as performed by the third device, and the reference may be associated with the sender device.

According to a fifth aspect there is provided a communications device which comprises circuitry configured to carry out the method according to any one of the first, second, third or fourth aspects.

According to a sixth aspect there is provided a computer program product, comprising computer program code which is stored on a computer-readable storage medium and which, when executed on a processor, carries out a method according to any of the first, second, third or fourth aspects.

According to a seventh aspect there is provided method in a communications system for enabling authentication of a sender device and a receiver device in the communication system, wherein the sender device is associated with a first identity, a first master device and a third device; the receiver device is associated with a second identity, a second master device and the third device; and wherein the authentication is enabled by utilizing the first master device, the second master device and the third device for the sender device and the receiver device to verify the identities of each other.

According to an eight aspect there is provided a method performed by a sender device for enabling authentication, the method comprising creating an identification of the sender device; sending a request pertaining to establishing a relation between the sender device and a receiver device to the receiver device; receiving at least an identification of a second master device; sending the identification of the second master device to a first master device; receiving a message pertaining to acknowledgement of communication conditions; and in a case the sender device fulfills the communication conditions, providing a first access key to the first master device.

According to a ninth aspect there is provided a method performed by a receiver device for enabling authentication, the method comprising creating an identification of the receiver device; receiving a request pertaining to establishing a relation between a sender device and the receiver device; sending at least an identification of a second master device to the sender device; receiving a message pertaining to acknowledgement of communication conditions; and in a case the sender device fulfills communication conditions, providing a second access key to the second master device.

The second, third, fourth, fifth, sixth, seventh, eight and ninth aspects may generally have the same features and advantages as the first aspect.

The features of the eight aspect may also be features of the second aspect. The features of the ninth aspect may also be features of the third aspect.

Other aspects, features and advantages of the disclosed embodiments of the present invention will appear from the following detailed disclosure, from the attached claims as well as from the drawings.

Generally, all terms used in the claims, are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

Embodiments of the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Furthermore, like numbers refer to like elements throughout.

Figure 1:
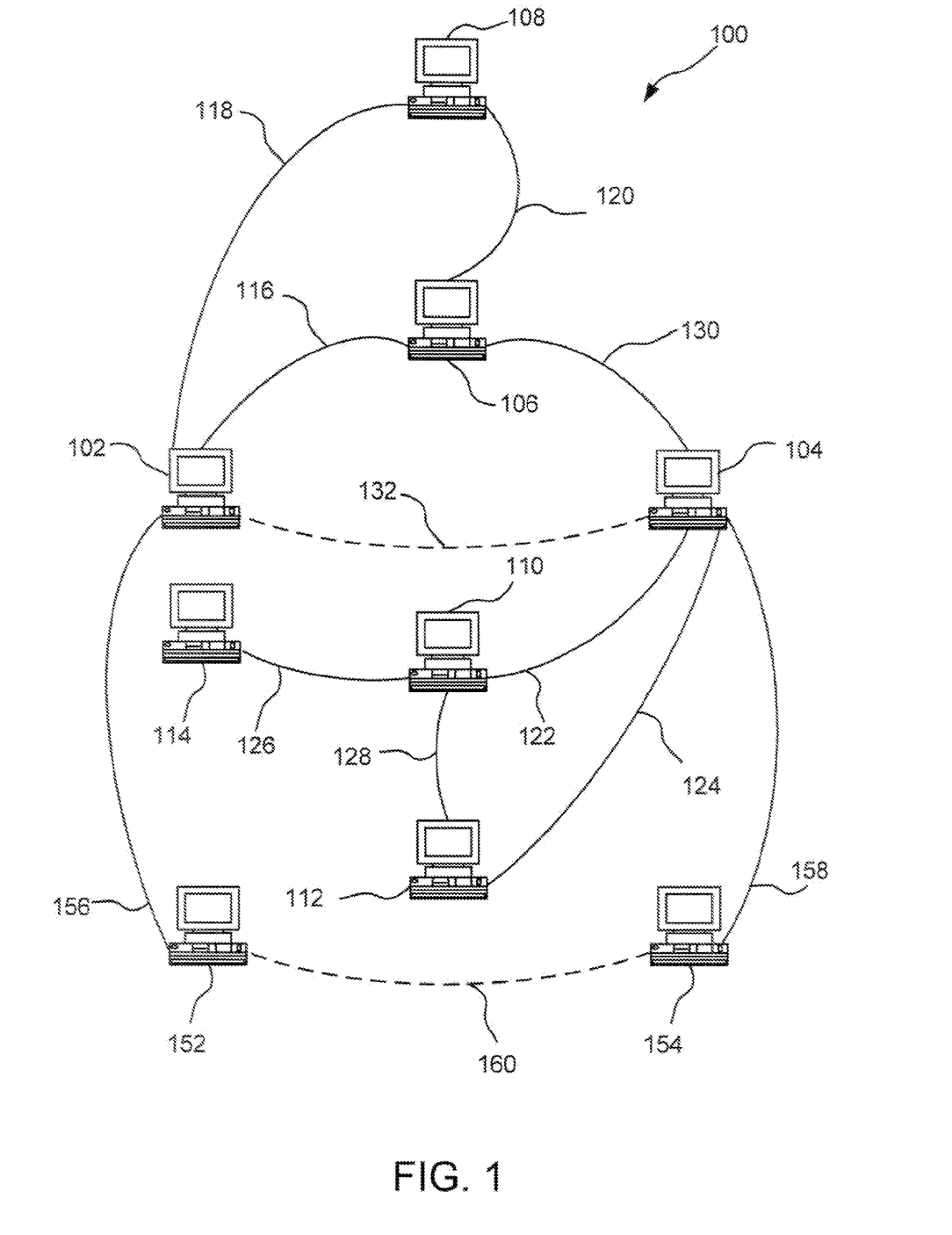
FIG. 1 is a schematic diagram of a communications system according to an embodiment.

FIG. 1 shows a schematic diagram of an exemplary communications system 100 in which the disclosed embodiments may be applied. The communications system 100 comprises a number of communication devices 102, 104, 106, 110, 112, 114 which may or may not be able to communicate with each other. A method in which a first communication device 102, hereinafter denoted as a sender device 102, wishes to establish a connection with a second communication device 104, hereinafter denoted as a receiver device 104, will be described below. It should be understood that the communication device 102, is not limited to be a sender device only, it may alternatively be a receiver device or take the role of both a sender device and a receiver device in the communications system 100. Similarly the communication device 104, is not limited to be a receiver device only, it may alternatively be a sender device or take the role of both a receiver device and a sender device in the communications system 100. That is, any communication device within the communication system 100 may include both sender and receiver capability. The sender or receiver devices may also act as a third party device. The functionality of the third party device will be further described below. However, it should be noted that when communications is to be established between a sender device 102 and a receiver device 104, neither the sender device 102 nor the receiver device 104 may act as a third device in the process of establishing communications between the devices 102 and 104.

In the following it will be assumed that at least part of the system 100 is in a state of operation.

When the communication devices 102, 104, 106, 108, 110, 112, 114 are connected to the system 100 each communication device 102, 104, 106, 108, 110, 112, 114 may create a unique identification, or identity, to be used in future communications in order to identify said communication device 102, 104, 106, 108, 110, 112, 114, it should be noted that the unique identity defined by the identification may not be validated by any other communication device 102, 104, 106, 108, 110, 112, 114 in the system 100. The unique identity is accepted by other devices in the system 100 when a relation, that is, communication, is established. The unique identity is thus used for matching purposes and may not have controlling authority. Moreover, as will be explained below, even if a unique identity of a first device in the system 100 is copied by a second device in the system 100, or alternatively that the identity of the first device is identical to the identity of the second device by chance, this will not affect the process of establishing a digital relation between two devices in the system 100.

Typically such a unique identity may take the form of a sequence of random binary or integer numbers. The longer the sequence the higher the probability of generating a sequence that is unique for each communication device 102, 104, 106, 108, 110, 112, 114. The unique identity may alternatively, or additionally, be associated with a serial number of the communication device 102, 104, 106, 108, 110, 112, 114.

A communication device 102, 104, 106, 108, 110, 112, 114 which is able to communicate with other communication devices 102, 104, 106, 108, 110, 112, 114 is thus associated with a digital identity. The digital identity may also be associated with a number of references. A reference of a digital identity may pertain to the collated information provided by other communication devices 102, 104, 106, 108, 110, 112, 114 regarding the communication device 102, 104, 106, 108, 110, 112, 114 associated with said digital identity. References will be further discussed below.

In an initial step the sender device 102 creates an identification of the sender device 102 and the receiver device 104 creates an identification of the receiver device 104. Typically, the communication devices 102, 104, 106, 108, 110, 112, 114 may need to create an identification only once.

Each communication device 102, 104, 106, 108, 110, 112, 114 may keep track of each established communication e.g. by means of associating each established communication with a sequence number. The sequence number is associated with the communication device to which a communication was established.

In FIG. 1 solid lines 116, 118, 120, 122, 124, 126, 130 between two communication devices 102, 104, 106, 108, 110, 112, 114 represents that communication has previously been established between the two communication devices at each end of the solid line 116, 118, 120, 122, 124, 126, 128, 130. For example, assume that the receiver device 104 has previously established communication with the communication devices 106, 110, 112 as indicated by the solid lines 130, 122, 124 in FIG. 1. As indicated by the dashed line 132 communications is to be established between the sender device 102 and the receiver device 104.

Assume further that the relative order in which communication was established from the receiver device 104 to the communication devices 106, 110, 112 was established in the order 106, 112, 110. That is, communication was established from the receiver device 104 to the communication device 112 before communication was established from the receiver device 104 to the communication device 110 and after communication was established from the receiver device 104 to the communication device 106.

All sequence numbers of a communication device may be associated with a list of sequence numbers. This list is preferably stored in the communication device. Denote by L104 the list of sequence numbers for receiver device 104. Denote further identification information of communication device 108 as interpreted by the sender device 104 as ID(104,106) and similarly ID(104,110) and ID(104,112) for communication devices 110 and 112, respectively.

The sequence number for an established communications from a first communication device to a second communication device may further comprise a number representing the relative order in which the communication was established from the second device to the first device. Assume that communication device 110 established communications with the devices 104, 112, 114 in the order 112, 104, 114. That is, in this exemplary scenario communication from the communication device 110 to the sender device 104 was the second (2nd) established communication from the communication device 110. Similarly, assume that for in this example communications from the third device 106 to the receiver device 104 was the third (3rd) communication established from the third device 106; assume that for in this example communications from the communication device 112 to the receiver device 104 was the fifth (5th) communications established from the third device 112.

In this exemplary scenario the list L(104) of sequence numbers of the receiver device 104 may thus have the form:
L(104)=ID(104,106), 3
ID(104,112), 5
ID(104,110), 2.

Thus, utilizing such lists of sequence numbers comprised in the communication devices 102, 104, 106, 108, 110, 112, 114 allows for two or more communication devices 102, 104, 106, 108, 110, 112, 114 to be associated with the same unique identity without producing conflicting statements in the communications system 100.

Assuming that the sender device 102 wishes to establish a communication with the receiver device 104, as indicated by the dashed line 132 in FIG. 1, the sender device 102 sends a request pertaining to establishing a relation between the sender device 102 and the receiver device 104 to said receiver device 104.

The receiver device 104 then sends at least an identification of a second master device 154 to the sender device 102. When receiving the identification of the second master device 154 the sender device 102 forwards the identification of the second master 154 device to a first master device 152.

The first master device 152 and the second master device 154 may be viewed as digital notaries. A digital notary may be a company, agency or authority, or the like which may act as notary in digital communications systems and networks. As such the digital notary may provide certified digital witnesses. Digital witnesses will be further disclosed below. The digital notary may also provide archive and/or functionalities and/or means. It may be required that the master devices 152 and 154 are certified by an organization, see below.

The first master device 152 then sends a request pertaining to communication conditions to the second master device 154, which conditions according to the second master device 154 need to be fulfilled in order for the sender device 102 to establish communication with the receiver device 104. The communication conditions may be associated with a set of values which may pertain to security issues and identification issues. For example the identification issues may relate to communication policies, such as communication protocols, utilized between the sender device 102 and the receiver device 104. It should be noted that the first master device 152 does not need to communicate an identity of the sender device 102 to the second master device 154.

The second master device 154 then sends the communication conditions to the first master device 152. In case the sender device 102 fulfills the communication conditions, the first master device 152 may acknowledge to the second master device 154 that the communication conditions are fulfilled. Similarly the first master device may communicate communication conditions to the second master device 154, which need to be fulfilled by the receiver device 104, to establish communication with the sender device 102.

A first access key may then be provided by the sender device 102 to the first master device 152, and a second access key may be provided by the receiver device 104 to the second master device 154. Thus by utilizing such access keys access rights may be enabled.

Communication pertaining to the sender device 102 and the receiver device 104 may then be enabled between the first master device 152 and the second master device 154. By utilizing the first master device 152 and the second master device 154 authentication of the sender device 102 and the receiver device 104 may be achieved.

The request sent from the sender device 102 to the receiver device 104 pertaining to establishing a relation between the sender device 102 and the receiver device 104 may comprises at least an identification of a first group of devices 106, 108. The first group of devices 106, 108 is a group of devices with which the sender device 102 has previously established a communication. In this case the disclosed method may continue as follows. The request is received by the receiver device 104. In response to the request the receiver device 104 analyses the identities of the devices comprised in the first group of devices 106, 108 and compares the identities to an intermediate group of devices 106, 110, 112 to which the receiver device has previously established a communication with. The receiver device 104 then sends at least an identification of a second group of devices to the sender device 102. The second group of devices comprises the device(s) 106 which are comprised in both the first group of devices and the intermediate group of devices. That is, the second group comprises devices(s) 106 which are common and known by both the sender device and the receiver device, or in other words, devices with which both the sender device 102 and the receiver device 104 have previously established a connection. That is, the second group may be represented by an empty set if the sender device 102 and the receiver device 104 have no common communication devices to which they both have previously established a communication. The identification of the second group is then received by the sender device 102.

In a case there exists at least one common device, hereinafter denoted as a third device 106, in the first group and said second group of devices, the establishment of a communication between the sender device and the receiver continues as follows. The sender device 102 requests a reference from at least one of the common third device(s) 106 regarding the receiver device 104.

References have briefly been discussed above. A reference may be based on a Hash value. Hash values per se are known in the art and will thus not be further described in this disclosure. The reference may also be based on a set of statements, wherein the statements may inter alia pertain to contact information, such as a name and/or an address, of a user of the device of which the reference is associated with. For example, if the reference is associated with the receiver device 104 the reference may comprise a name and/or an address of the receiver device 104 and/or a user of the receiver device 104. The reference may be comprised in an XML document.

Further, a reference may be associated with a sender and a recipient. Thus, in other words a reference may be said to be signed (by a sender) towards a recipient, wherein the signature which is used to sign the reference then advantageously comprise identification of the recipient device.

Optionally, when the reference is transmitted from a first device to a second device, for example from the receiver device 104 to the sender device 102, the reference may be encrypted, which may have the general effect of increasing confidentiality and security of the transmission, and in particular increasing confidentiality and security of the transmission of the reference.

The sender device 102 requests a reference of the receiver device 104 from the third device 106, wherein the reference sent from the third device 106 is addressed to and associated with the sender device 102, and wherein the sent message comprising the reference may be encrypted by the third device 106 such that only the sender device 102 may decrypt the message part comprising the reference. The sender device 102 may for example request information pertaining to identification of the receiver device 104 as performed by the third device 106.

That is, the third device 106 may perform identification of the receiver device 104 by comparing references or reference values. The reference values may be Hash values. The reference values may alternative be sequence numbers. The reference may alternative be identity information received from the sender device. The references or reference values may be a combination of Hash values, sequence numbers and identity information.

The third device 106 may thus be viewed as a trusted third part. The information pertaining to identification of the receiver device 104 may be associated with a previously established communication between the receiver device 104 and the third device 106.

When the sender device 102 receives the reference from the third device 106, which reference has been sent from the third device 106 to the sender device 102 via the receiver device 104, the sender device 102 may verify the reference by comparing information comprised in the reference with previously stored information associated with the third device 106, such as a sequence number associated with previous communication between the sender device 102 and the third device 106. If the message part comprising the reference has been encrypted by the third device 106 the sender device 102 may first need to decrypt the message.

The reference may also be associated with the sender device 102 by incorporating an address field in the reference and to add the identity of the sender device 102 in the address field. This adds security to the process since the sender device 102 may ensure that the information delivered to the third device 102 is associated with the sender device 102 although the request is sent from the sender device 102 to the receiver device 104 and not from the sender device 102 directly to the third device 106. That is, the reference request is received by the receiver device 104, which receiver device 104 then forwards the reference request to the third device 106. The third device 106 thus receives the reference request regarding the receiver device 104 from the receiver device 104. The third device 106 then sends the reference to the receiver device 104. The receiver device 106 thus receives the reference and sends the reference to the sender device 102, which receives and verifies the reference.

The sender device 102 may then create a first public encryption key for establishing communication from the sender device 102 to the receiver device 104.

The sender device 102 then encrypts the received reference with the created first public encryption key. Further, the sender device 102 encrypts the created first public encryption key using an additional public encryption key, wherein the additional public encryption key is associated with the previously established communication between the sender device 102 and the third device 106. The encrypted first public encryption key and the encrypted received reference are then sent from the sender device 102 to the receiver device 104. The receiver device 104 thus has no knowledge of the first public encryption key as created by the sender device 102. In addition the receiver device 104 has no knowledge of the additional public encryption key associated with the previously established communication between the sender device 102 and the third device 106. Hence the receiver device 104 is neither able to decrypt the encrypted first public encryption key nor the encrypted received reference.

In order for the receiver device 104 to validate the information pertaining to the previously established communication between the receiver device 104 and the third device 106 comprised in the encrypted reference the receiver device 104 forwards the encrypted first public encryption key to the third device 106. This message sent from the receiver device 104 to the third device 106 further comprises a request pertaining to decryption of the encrypted first public encryption key. Since the first public encryption key has been encrypted with the additional public encryption key which, as stated above, is associated with the previously established communication between the sender device 102 and the third device 106, the third device 106 is able to decrypt the encrypted first public encryption key. The decrypted first public encryption key can then be sent back from the third device 106 to the receiver device 104. For added security the third device 106 may encrypt the decrypted first public encryption key using a further public encryption key using an additional public encryption key, wherein the additional public encryption key is associated with the previously established communication between the third device 106 and the receiver device 104.

Since the receiver device 104 knows the further public encryption key which has been used to encrypt the first public encryption key the receiver device 104 may thus decrypt the, received encrypted first public encryption key after reception.

Using the decrypted first public encryption key the receiver device 104 may thus decrypt the previously received encrypted reference pertaining to the previously established communication between the receiver device 104 and the third device 106. The receiver device 104 may then validate the contents of the reference. That is, by comparing information comprised in the reference to information, such as sequence numbers, comprised in the receiver device 104, the receiver device 104 is able to verify that information comprised in reference is correct and indeed pertains to the previously established communication between the receiver device 104 and the third device 106.

If the reference comprises a Hash value (as described above) the receiver device 104 may calculate the Hash value of the first public encryption key. The receiver device 104 may then perform a comparison between this calculated Hash value and the Hash value comprised in the reference in order to verify that the reference has not been altered during the transmission from the third device 106 to the sender device 102 via the receiver device 104, or from third device 106 to the receiver device 104.

An established communication between a sender device 102 and a receiver device 104 may be said to define a digital contract. A digital contract may thus pertain to a digital relationship between two or more communication devices 102, 104, 106, 108, 110, 112, 114, wherein the contract may comprise information pertaining to digital signatures and/or digital witnesses (as will be further disclosed below). A digital contract thus created may be utilized to identify the communication device 102, 104, 106, 108, 110, 112, 114 when the communication device 102, 104, 106, 108, 110, 112, 114 interacts, or communicates, with other communication devices 102, 104, 106, 108, 110, 112, 114. Digital contracts may be utilized for authentication, access rights and/or for signature purposes. Digital contracts may therefore be used to retrieve references.

Figure 2:
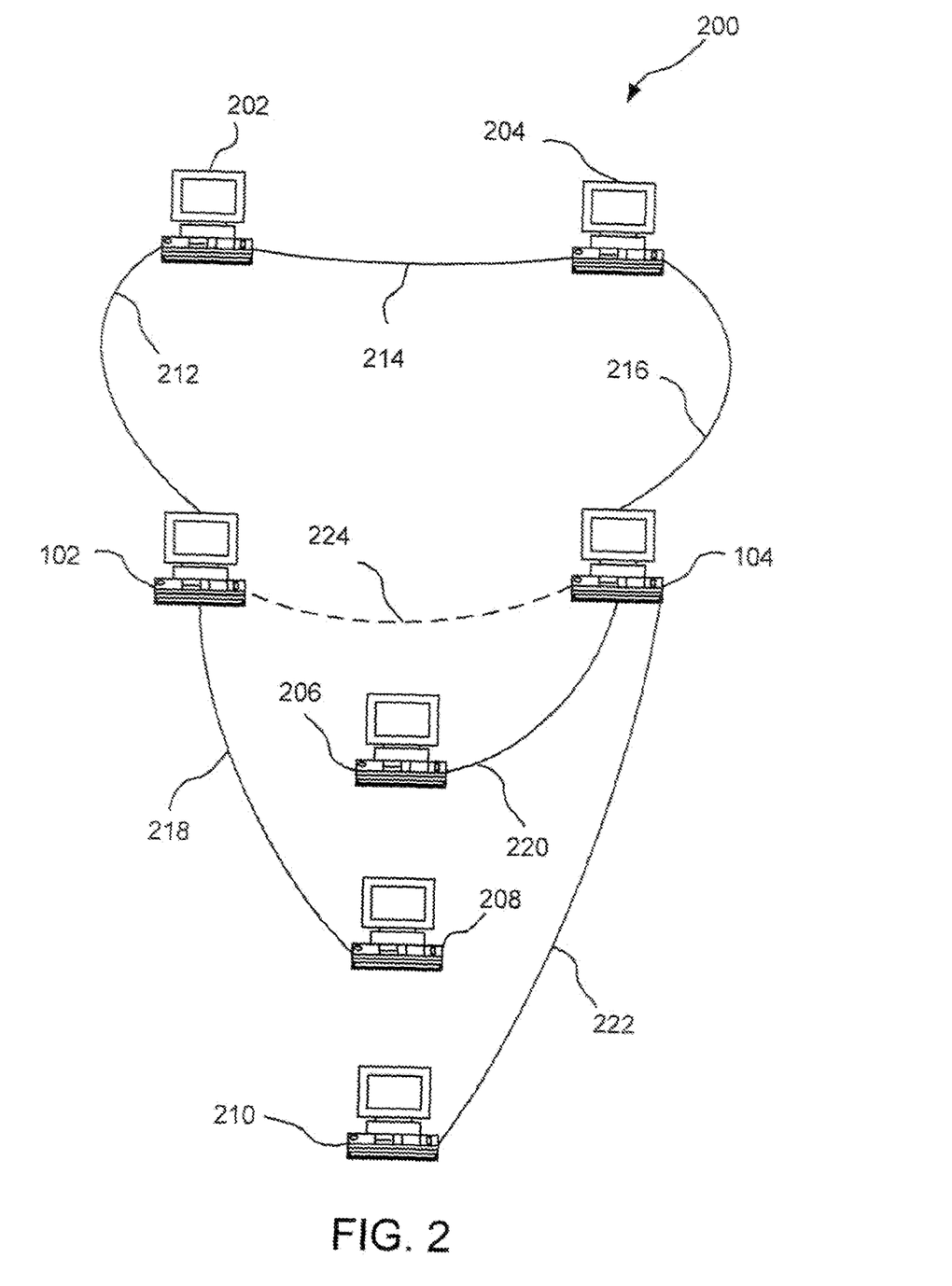
FIG. 2 is a schematic diagram of a communications system according to an embodiment.

FIG. 2 shows a schematic diagram of a communications system 200 in which the invention may apply. As in the communications system 100 of FIG. 1, the communications system 200 comprises a number of communication devices 102, 104, 202, 204, 206, 208, 210 which may or may not be able to communicate with each other.

In the following it will be assumed that the system 200 is in a state of operation and that communications is to be established between a sender device 102 and a receiver device 104, as indicated by the dashed line 224.

As for the method disclosed above with reference to the communications system 100 of FIG. 1, a first device 102, denoted a sender device, wishes to establish a communication with a second device 104, denoted a receiver device, in the communications system 200. In the exemplary scenario of FIG. 2 the sender device 102 is associated with communication devices 202 and 208. That is, the sender device 102 has previously established communication with communication devices 202 and 208 as indicated by the solid lines 212 and 218. Similarly, the receiver device has previously established communication with communication devices 204, 206 and 210 as indicated by the solid lines 216 and 222.

It may thus be concluded that the sender device 102 and the receiver device 104 according to this scenario do not share a common communication device. In the language set forth above with reference to FIG. 1 the second group may be represented by an empty set. However, it is assumed that the sender device 102 is associated with a fourth device 202. Further the receiver device 104 is associated with a fifth device 204. The fourth device 202 is moreover associated with the fifth device 204 as indicated by the solid line 214. See further the description associated with FIG. 3 below.

Wherein in a case there does not exist at least one common third device in the first group and the second group of devices, the establishment of a communication between the sender device and the receiver may continue as follows.

The sender device 102 sends a request comprising at least an identification of at least one sub-group associated with a fourth device 202 with which sub-group the sender device 102 is associated. This request is received by the receiver device 104. The receiver device 104 analyses the identification of the at least one sub-group comprised in the request and compares the identification to a list comprising at least one sub-group with which the receiver device 104 is associated.

In a case at least one common sub-group is found the receiver device 104 sends at least an identification of the at least one common sub-group associated with a fifth device 204 to the sender device 102. The at least one common sub-group is thus associated with both the sender device 102 and the receiver device 104. It may thus be said that the sender device 102 may be associated with the receiver device 104 via the fourth device 202 and the fifth device 204.

The identification of the at least one common sub-group is then received by the sender device 102. The sender device 102 then sends a message to the receiver device 104, wherein the sender device 102 requests a reference from the fifth device 204 regarding said receiver 104. The message further comprises information that the reference is to be validated by the fourth device 202. This request is forwarded to the fifth device 204 by the receiver device 104. After reception the fifth device 204 sends the reference to the receiver device 104 and the receiver device 104 forwards the reference to the sender device.

However, since it may be assumed that communication has not been established between the sender device 104 and the fifth device 204 (otherwise the sender device 102 and the receiver device 104 should have the fifth device 204 as a common device) the sender device 102 may not be able to validate the received reference. Therefore the sender device 102 sends the received reference to the fourth device 202 for validation, wherein the message sent from the sender device 102 to the receiver device 202 may also comprise information pertaining to the origin of the reference. For the present case the origin of the reference is the fifth device 204. After reception and validation of the reference the fourth device 202 sends the validated reference to the sender device 102. The message from the fourth device 202 to the sender device 102 may also comprise validating information pertaining to the origin of the reference. That is, for the present case the validating information pertaining to the origin of the reference would disclose the fifth device 204 as the origin.

The sender device 102 may then create a first public encryption key for ester establishing communication from the sender device 102 to the receiver device 104.

The sender device 102 then encrypts the received reference with the created first public encryption key. Further, the sender device 102 encrypts the rested first public encryption key using an additional public encryption key, wherein the additional public encryption key is associated with the previously established communication between the sender device 102 and the fourth device 202. The encrypted first public encryption key and the encrypted received reference are then sent from the sender device 102 to the receiver device 104. The receiver device 104 thus has no knowledge of the first public encryption key as created by the sender device 102. In addition the receiver device 104 has no knowledge of the additional public encryption key associated with the previously established communication between the sender device 102 and the fourth device 202. Hence the receiver device 104 is neither able to decrypt the encrypted first public encryption key nor the encrypted received reference.

In order for the receiver device 104 to validate the information pertaining to the previously established communication between the receiver device 104 and the fifth device 204 comprised in the encrypted reference the receiver device 104 forwards the encrypted first public encryption key to the fifth device 204. This message sent from the receiver device 104 to the fifth device 204 further comprises a request pertaining to decryption of the encrypted first public encryption key.

Since the first public encryption key has been encrypted with the additional public encryption key which, as stated above, is associated with the previously established communication between the sender device 102 and the fourth device 202, the fifth device 204 is thus not able to decrypt the encrypted first public encryption key. In order for the encrypted first public encryption key to be decrypted the fifth device 204 thus forwards the request to the fourth device 202, which thus is able to decrypt the encrypted first public encryption key. The decrypted first public encryption key can then be sent back from the fourth device 202 to the receiver device 104 via the fifth device 204. For added security the fourth device 202 and the fifth device 204 may encrypt the decrypted first public encryption key using further public encryption keys. Separate encryption keys are used during transmission from the fourth device 202 to the fifth device 204 and during transmission from the fifth device 204 to the receiver device 104.

Using the decrypted first public encryption key the receiver device 104 may thus decrypt the previously received encrypted reference pertaining to the previously established communication between the receiver device 104 and the fifth device 204. The receiver device 104 may then validate the contents of the reference. That is, by comparing information comprised in the reference to information, such as sequence numbers, comprised in the receiver device 104, the receiver device 104 is able to verify that information comprised in reference is correct and indeed pertains to the previously established communication between the receiver device 104 and the fifth device 204.

If the reference comprises a Hash value (as described above) the receiver device 104 may calculate the Hash value of the first public encryption key. The receiver device 104 may then perform a comparison between this calculated Hash value and the Hash value comprised in the reference in order to verify that the reference has not been altered during transmission.

In a case there are no sub-groups common to both the sender device 102 and the receiver device 104, the receiver device 104 may send a message to the sender device 102 indicating that no common sub-groups are found. The receiver device 104 may further request that the sender device 102 sends a new request comprising at least an identification of at least one sub-group with which the sender device 102 is associated, and which identification was not previously transmitted from the sender device 102 to the receiver device 104. The receiver device 104 then receives this new request and analyses the identification as described above. The outlined procedure may continue until a common sub-group is found. Alternatively, if no common sub-group is to be found the process of establishing communications between the sender device 102 and the receiver device 104 may be terminated. Alternatively, if no common sub-group is to be found the sender device 102 and the receiver device 104 may search for a common device associated with a higher hierarchical level, as will be described below.

Figure 3:
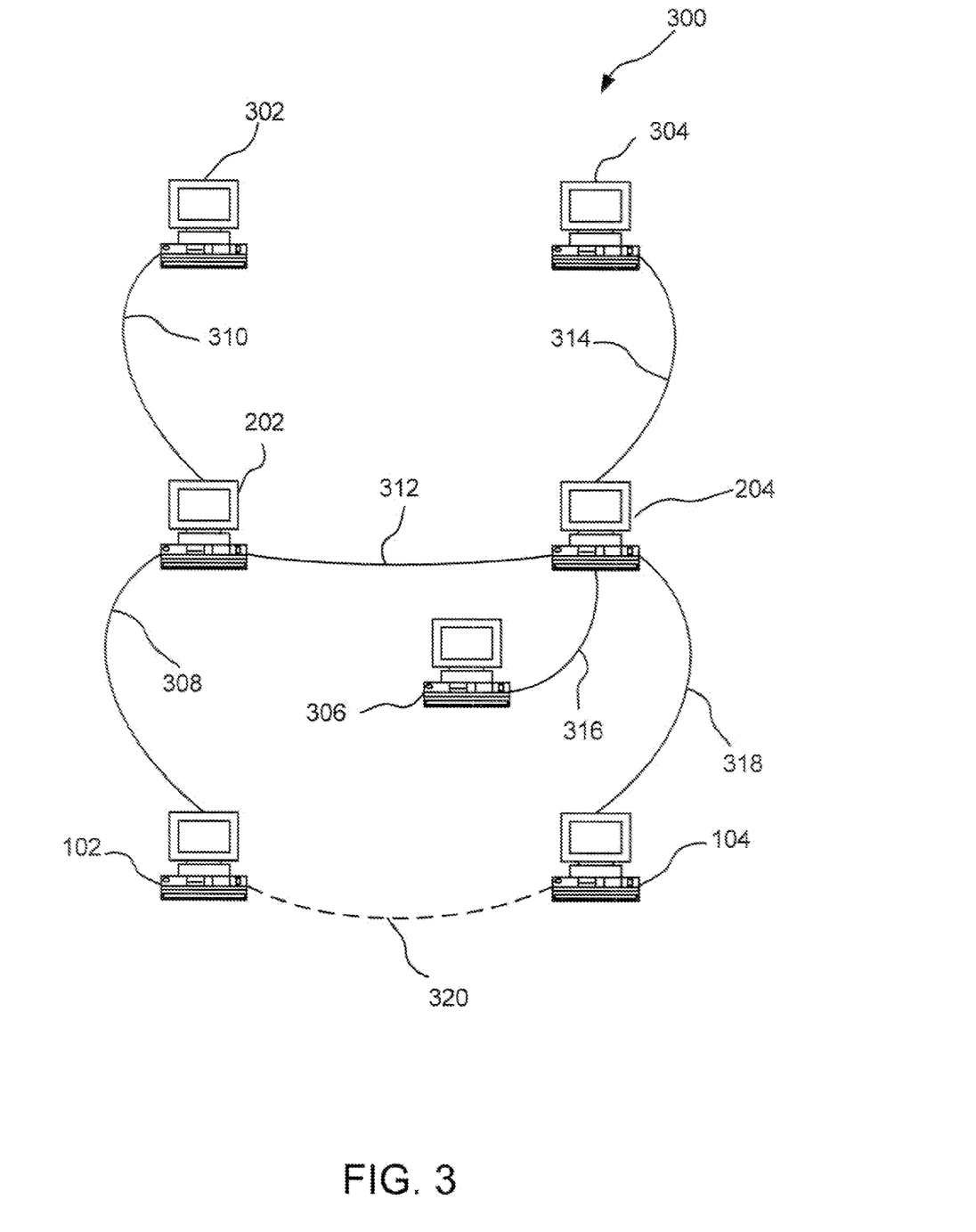
FIG. 3 is a schematic diagram of a communications system according to an embodiment.

FIG. 3 shows an example of a communications system 300 in which communication has previously been established between the fourth device 202 and devices 102 and 302, respectively, as indicated by the solid lines 308 and 310, and wherein communication has been established between the fifth device 204 and devices 104, 304 and 306, respectively, as indicated by the solid lines 318, 314 and 316. Further, communications is to be established by a sender device 102 and a receiver device 104 as indicated by the dashed line 320. Thus, devices 102, 202 and 302 may be said to represent a first sub-group of the communications system 300 whilst devices 104, 204, 304 and 306 may be said to represent a second sub-group of the communications system 300. The sub-groups may also be said to represent different classes.

The sub-groups may for example represent different geographical locations, such as different nations or countries or parts thereof. Thus, in this case the fourth device 202 and the fifth device 204 may for example represent or, act on the behalf of, different government bodies in the respective countries associated with the fourth device 202 and the fifth device 204, respectively. For example, the fourth device 202 may be geographically located in a first nation whilst the fifth device 204 may be geographically located in a second nation different from said first nation. Examples of suitable government bodies may include an agency responsible of handling identification information, such as a national identity register. As such the fourth device 202 and the fifth device 204 may be said to represent so called trusted third parties.

The government bodies in different countries may be associated with an organization, such as a global trust center, which organization may enforce or suggest communication conditions which should be fulfilled by communication devices for the communication devices to be able to establish communication with each other. The organization may thus communicate these communication conditions to the above disclosed master devices. Moreover, it may be required that the organization certifies the master devices.

In a case the communications system 300 is associated with a corporate company the different sub-groups may represent different departments or divisions within the corporate company. Thus, in this case the fourth device 202 and the fifth device 204 (which are associated as indicated by the solid line 312) may for example represent different data service centers associated with each department or division associated with the fourth device 202 and the fifth device 204, respectively. Other examples include, but are not limited to, different Internet service providers, Internet communities, bank memberships, dub memberships, and the like. It is generally a requirement and/or an agreement that the sender device 102 and the receiver device 104 trusts the authority, agency, company, or the like (represented by the fourth device 202 and the fifth device 204) offering and/or being responsible of the Internet service, Internet community, bank membership, or club membership. Again, the fourth device 202 and the fifth device 204 may be said to represent so called trusted third parties. As will be appreciated by the skilled person these are just a few examples in which the invention may apply.

In general, it may thus be assumed that at least one device in each sub-group (here exemplified by the fourth device 202 in the first sub-group and the fifth device 204 in the second sub-group, respectively) has established communication with a device in another sub-group. Further, in some case it may be assumed that one of the sub-group devices (such as the fourth device 202 in the first sub-group and the fifth device 204 in the second sub-group, respectively) acts as a government body which may be responsible for issuing memberships to each device in the sub-group.

In addition, a communication device may be associated with a plurality of different sub-groups, wherein each associated sub-group pertains to different applications. For example, on the one hand a communication device may be associated with a bank membership, and on the other hand the communication device may simultaneously be associated with Internet community.

Figure 4:
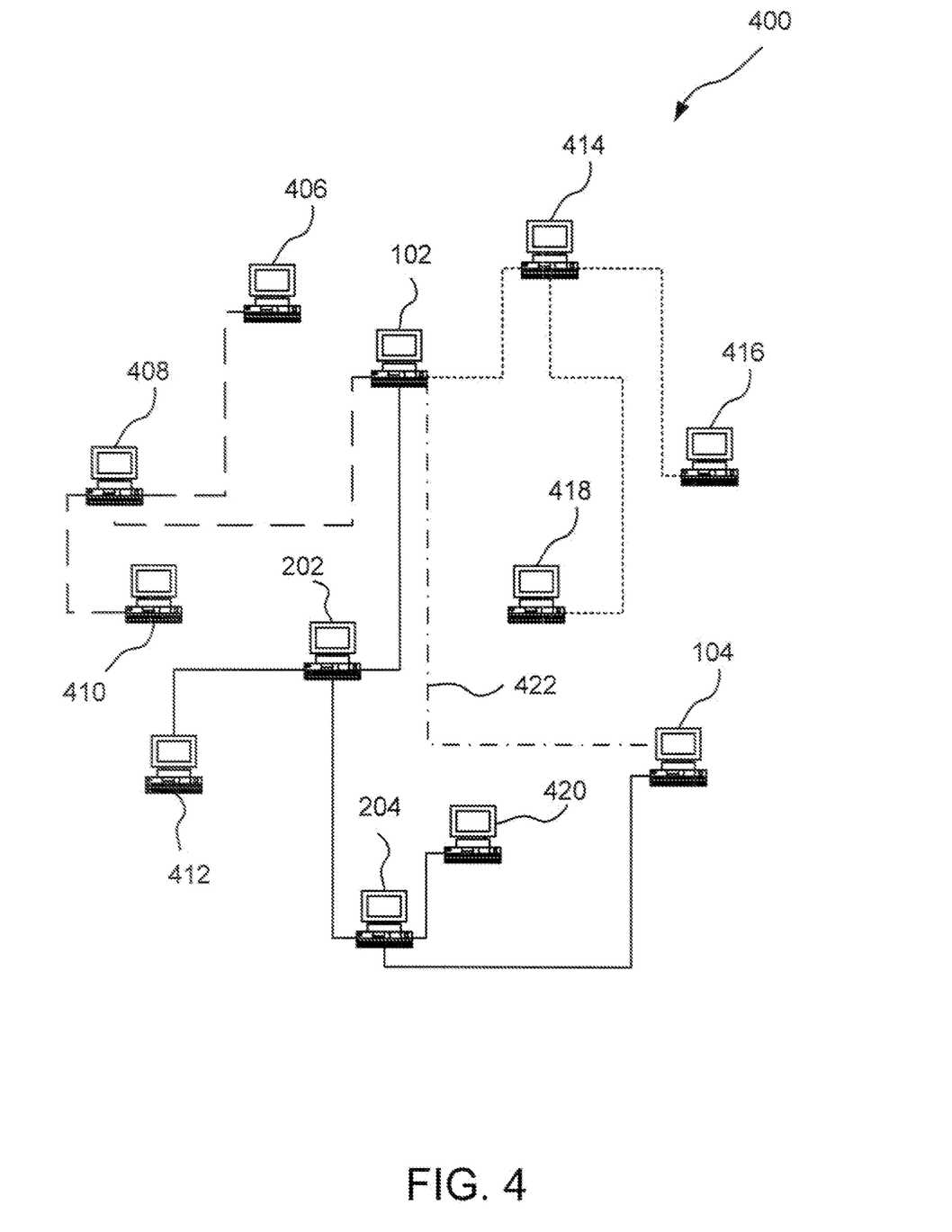
FIG. 4 is a schematic diagram of a communications system according to an embodiment.

FIG. 4 shows a schematic diagram of a communications system 400, similar to the communications system 300 of FIG. 3 in which the invention may be applied. As in FIG. 3 the sender device 102 wishes to establish communications to the receiver device 104 as indicated by the dash-dotted line 422, wherein the sender device 102 is associated with a first sub-group via the fourth device 202 and the receiver device 104 is associated with a second sub-group via the fifth device 204 as indicated by solid lines. According to the scenario as disclosed in FIG. 4 the first sub-group comprises devices 102, 202 and 412, whereas the second sub-group comprises devices 104, 204 and 420. With reference to the above the first and second sub-groups may represent different countries. For example the first sub-group may represent devices in a first country and the second sub-group may represent devices in a second country. The fourth device 202 and the fifth device 204 may then act as government bodies.

In this example the sender device 102 is further associated with a third sub-group comprising devices 102, 406, 408 and 410 as indicated by dashed lines and with a fourth sub-group comprising devices 102, 414, 416 and 418 as indicated by dotted lines. For example the third sub-group may represent devices associated with the same bank, whereas the fourth sub-group may represent devices associated with the same Internet service provider.

Figure 5:
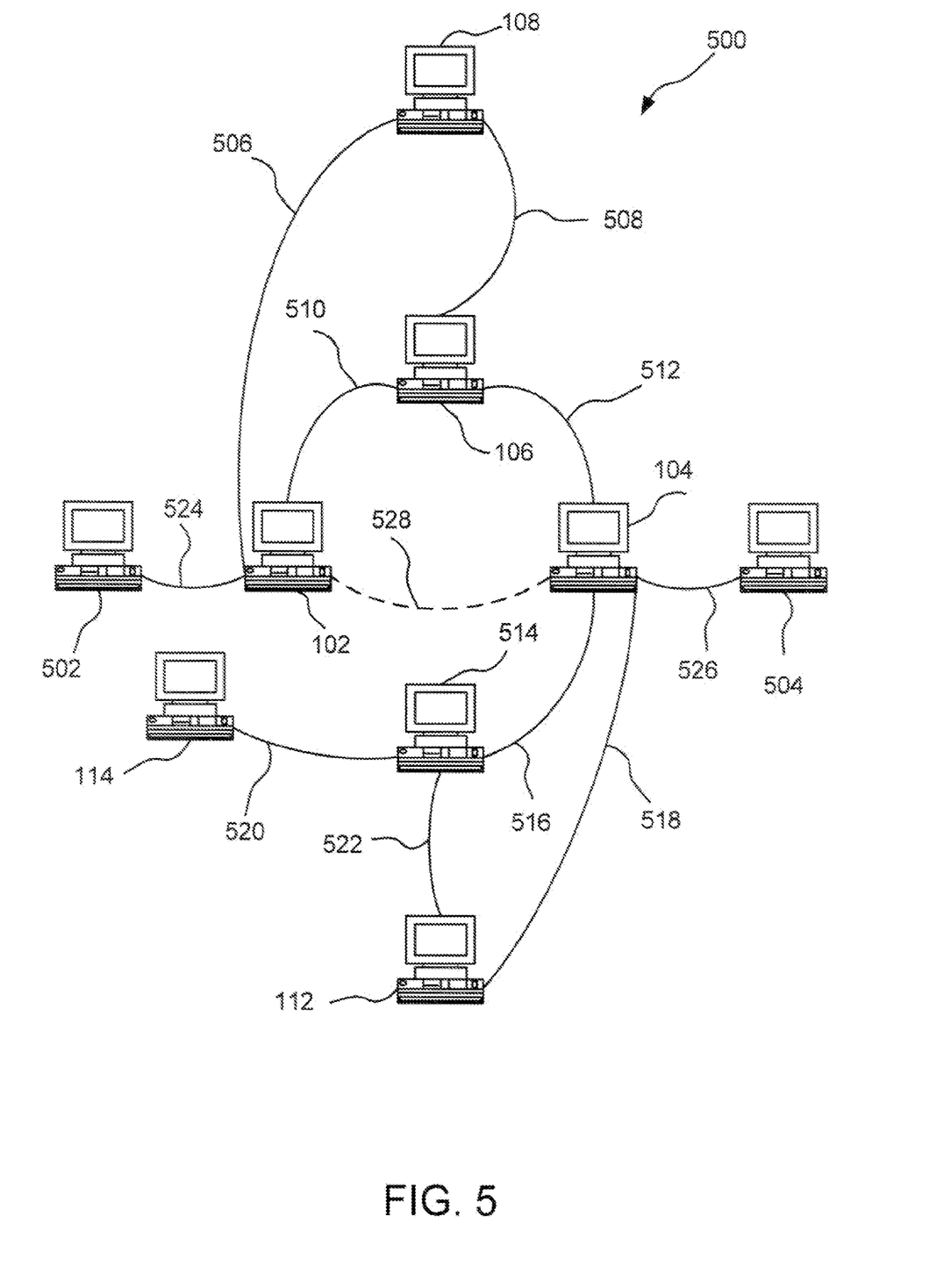
FIG. 5 is a schematic diagram of communication system according to an embodiment.
Figure 6:
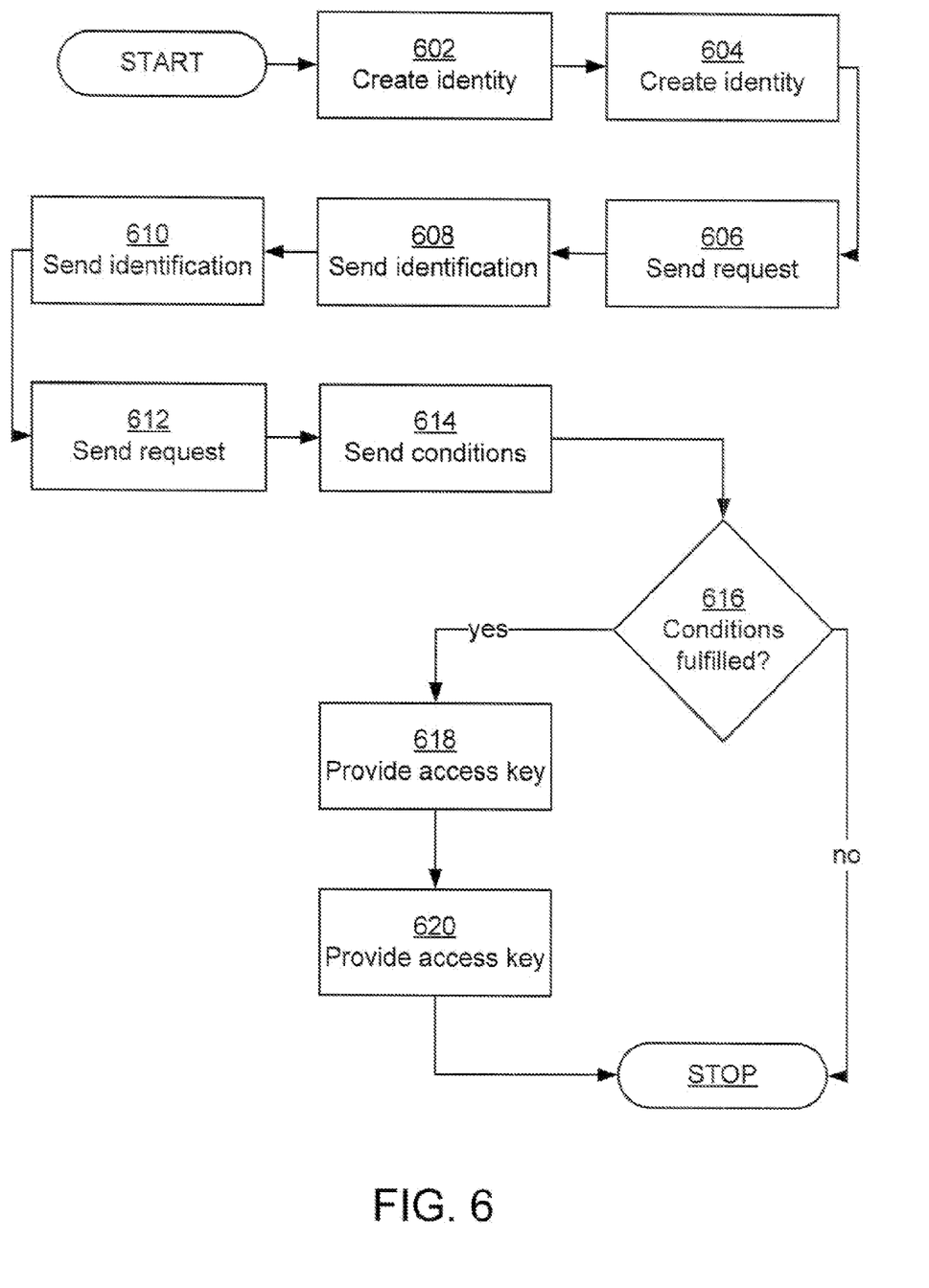
FIG. 6 is a flowchart of a method according to an embodiment.

FIG. 5 shows a schematic diagram of a communications system 500, similar to the communications system 100 of FIG. 1 in which the invention may apply. As in the communications system 100 of FIG. 1, the communications system 200 comprises a number of communication devices 102, 104, 106, 108, 110, 112, 114, 502, 504 which may or may not be able to communicate with each other.

In the following it will be assumed that the system 500 is in a state of operation.

As for the method disclosed above with reference to the communications system 100 of FIG. 1, a first device 102, denoted a sender device, wishes to establish a communication with a second device 104, denoted a receiver device, in the communications system 500. As in FIG. 1 solid lines 510, 512, 514, 516, 518, 520, 522, 524, 526 between two communication devices 102, 104, 106, 108, 110, 112, 114, 502, 504 represents that communication has previously been established between the two communication devices at each end of the solid line 510, 512, 514, 516, 518, 520, 522, 524, 526. That is, as in the exemplary scenario of FIG. 500 communication has previously been established e.g. between the sender device 102 and the third device 106, between the sender device 102 and a first auxiliary device 502, between the receiver device 104 and the third device 106, and between the receiver device 104 and a second auxiliary device 504. As indicated by the dashed line 528 communications is to be established between the sender device 102 and the receiver device 104.

The first and second auxiliary devices 502, 504, respectively, may be said to represent digital witnesses for the sender device 102 and the receiver device 104, respectively. That is, it may be required that all relations established involving the sender device 102 are monitored by the first auxiliary device 502. More generally, it may thus be required that all relations are monitored by auxiliary devices; a first auxiliary device 502 monitors the operations of, and/or the messages sent and received by, the sender device 102, whilst a second auxiliary device 504 monitors the operations of, and/or the messages sent and received by, the receiver device 102. The monitoring process of the first and second auxiliary devices 502, 504 may thus be said to involve capturing message transaction information, such as the sender and/or recipient of the message. The monitoring process of the first and second auxiliary devices 502, 504 may also comprise supplying the transmitted messages with a time stamp and/or a digital signature. Time stamps and digital signatures per se are known in the art and will thus not be further discussed in this disclosure. When establishing communication between a sender device 102 and a receiver device 104 the first auxiliary device 502 of the sender device 102 and the second auxiliary device 504 of the receiver device 204 may also be required to establish communication.

Next, with reference to the communications system 500 of FIG. 5 the process of terminating established communication between the sender device 102 and the receiver device 104 will be disclosed. However the process applies also to the communications systems 100, 200, 300 and 400 of FIGS. 1-4, mutatis mutandis.

Firstly, it is to be understood that in a case the first auxiliary device 502 monitors the operations of, and/or the messages sent and received by, the sender device 102, the messages sent by the sender device 102 comprise two digital signatures; one digital signature associated with the sender device 102 and one digital signature associated with the first auxiliary device 502.

Thus in a case the first auxiliary device 502 monitors all communications relations established by the sender device 102 the sender device 102 may terminate the established communication between the sender device 102 and the receiver device 104 by sending a message to the first auxiliary device 502, wherein the message comprises information stating that the first auxiliary device 502 shall not insert a digital signature into the monitored message. That is, in this case the messages sent by the sender device 102 comprise one digital signature, which digital signature is associated with the sender device 102. If the receiver device 104 receives a message not comprising a digital signature of the first auxiliary device 502 the receiver device 502 may choose to classify the received message as incomplete and may thus further ignore its contents. Since the receiver device 104 ignore the contents of the received message the established communication from the sender device 102 to the receiver device 104, and/or the established communication between the sender device 102 and the receiver device 104 may be said to have been terminated. Alternatively, the receiver device 104 may send a message to the sender device 102 stating that the received messages was interpreted as incomplete since the received message did not comprise a digital signature of the first auxiliary device 502.

A method in a communications system 100, 200, 300, 400, 500 for authentication of a sender device 102 and a receiver device 104, wherein the method has been disclosed above with references to FIGS. 1-5, can also be illustrated in a flowchart. Thus such a method may be summarized as comprising creating, in a step 602, by the sender device 102, an identification of the sender device 102; creating, in a step 604, by the receiver device 104, an identification of the receiver device 104; sending, in a step 606, by the sender device 102, a request pertaining to establishing a relation between the sender device 102 and a receiver device to the receiver device 104; sending, in a step 608, by the receiver device 104, at least an identification of a second master device 154 to the sender device 102; sending, in a step 610, by the sender device 102, the identification of the second master device 154 to a first master device 152; sending, in a step 612, from the first master device 152, a request pertaining to communication conditions needed by the sender device 102 for the sender device 102 to establish communication with the receiver device 104 to the second master device 154; sending, in a step 614, from the second master device 154, the communication conditions to the first master device 152; if it is determined, in a step 616, that the sender device 102 fulfills the communication conditions, providing, in a step 618, by the sender device 102, a first access key to the first master device 152; and providing, in a step 620, by the receiver device 104, a second access key to the second master device 154.

It should here be noted that a system and method for establishing communications from a sender device 102 to a receiver device 104 has been disclosed. However, as the skilled person will understand, communications from the receiver device 104 to the sender device 102 may be established in the same way since, as stated above, the sender device 102 may also comprise the functionality of the receiver device 104 and vice versa. Thus the sender device 102 may interchangeably act as a receiver device 104 and vice versa. Thus it may be said that the above system and method may be applied for establishing communications between the sender device 102 and the receiver device 104.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a communication system for authentication of at least one of a sender device and a receiver device in said communication system, said method comprising:
creating, by said sender device, an identification of said sender device;
creating, by said receiver device, an identification of said receiver device;
sending, by said sender device, a request pertaining to establishing a relation between said sender device and said receiver device to said receiver device;
sending, by said receiver device, at least an identification of a second master device to said sender device;
sending, by said sender device, said identification of said second master device to a first master device;
sending, from said first master device, a request pertaining to communication conditions needed by said sender device for said sender device to establish communication with said receiver device to said second master device;
sending, from said second master device, said communication conditions to said first master device; and
in a case said sender device fulfills said communication conditions,
providing, by said sender device, a first access key to said first master device; and
providing, by said receiver device, a second access key to said second master device.

2. The method according to claim 1, wherein said request pertaining to establishing said relation between said sender device and a receiver device to said receiver device comprises at least an identification of a first group of devices, said method further comprising:
receiving, by said receiver device, said request;
sending, by said receiver device, at least an identification of a second group of devices to said sender device; and
receiving, by said sender device, said identification of a second group;
in a case there exists at least one third device, which is a device being one of the devices in both said first group and said second group of devices,
sending, by said sender device, a request pertaining to a reference from said at least one third device regarding said receiver device;
receiving, by said receiver device, said reference request and sending, by said receiver device, said request to said at least one third device;
receiving, by said receiver device, said reference and sending, by said receiver device, said reference to said sender device;
receiving, by said sender device, said reference; in response thereto;
creating, by said sender device a first public encryption key for establishing communication from said sender device to said receiver device;
encrypting, by said sender device, said reference using said first public encryption key;
encrypting, by said sender device, said first public encryption key using an additional public encryption key;
sending, by said sender device, said encrypted reference and said encrypted first public encryption key to said receiver device;
sending, by said receiver device, said encrypted first public encryption key to said at least one third device;
decrypting, by said at least one third device, said encrypted first public encryption key;
sending, by said at least one third device, said decrypted first public encryption key to said receiver device;
decrypting, by said receiver device, said encrypted reference; and
validating, by said receiver device, said decrypted reference.

3. The method according to claim 2, wherein the communication system further comprises a fourth device and a fifth device, and wherein said sender device is associated with said fourth device, said receiver device is associated with said fifth device and said fourth device is associated with said fifth device; and wherein in a case there does not exist at least one third device which is a device being one of the devices in both said first group and said second group of devices, said method further comprising:
sending, by said sender device, a request pertaining to a reference from said fifth device regarding said receiver device, wherein said request is sent to said receiver device;
forwarding, by said receiver device, said request to said fifth device;

sending, by said fifth device, said reference to said receiver device;
forwarding, by said receiver device, said reference to said sender device;
sending, by said sender device, said reference to said fourth device;
validating, by said fourth device, said reference and sending, by said fourth device, said validated reference to said sender device;
creating, by said sender device a first public encryption key for establishing communication from said sender device to said receiver device;
encrypting, by said sender device, said reference using said first public encryption key;
encrypting, by said sender device, said first public encryption key using an additional public encryption key;
sending, by said sender device, said encrypted reference and said encrypted first public encryption key to said receiver device;
sending, by said receiver device, said encrypted first public encryption key to said fourth device via said fifth device;
decrypting, by said fourth device, said encrypted first public encryption key;
sending, by said fourth device, said decrypted first public encryption key to said receiver device via said fifth device;
decrypting, by said receiver device, said encrypted reference; and
validating, by said receiver device, said decrypted reference.

4. A method performed by a sender device for enabling authentication, said method comprising:
providing a sender device;
creatin an identification of said sender device;
sending a request pertaining to establish a relation between said sender device and a receiver device to said receiver device, wherein said request comprises at least an identification of a first group of devices;
receiving at least an identification of a second group of device from said receiver device; and
in a case there exists at least one common third device in said first group and said second group of devices,
sending a request pertaining to a reference from said at least third device regarding said receiver device;
receiving said reference from said receiver device;
creating a first public encryption key for establishing communication from said sender device to said receiver device;
encrypting said reference using said first public encryption key;
encrypting said first public encryption key using an additional public encryption key; and
sending said encrypted reference and said encrypted first public encryption key to said receiver device; and
wherein said sender device is associated with a fourth device, said receiver device is associated with a fifth device and said fourth device is associated with said fifth device; and wherein in a case there does not exist at least one common third device in said first group and said second group of devices, said method further comprising:
sending a request pertaining to a reference from said fourth device regarding said receiver device; wherein said requesting is forwarded from said fourth device to said fifth device;
receiving said reference from said fourth device;
creating a first public encryption key for establishing communication from said sender device to said receiver device;
encrypting said reference using said first public encryption key;
encrypting said first public encryption key using an additional public encryption key; and
sending said encrypted reference and said encrypted first public encryption key to said receiver device.

5. A method performed by a receiver device for enabling authentication, said method comprising:
providing a receiver device;
creating an identification of said receiver device;
receiving a request pertaining to establishing a relation between said receiver device and a sender device from said sender device, wherein said request comprises at least an identification of a first group of devices;
sending at least an identification of a second group of devices to said sender device; and
in a case there exists at least one common third device in said first group and said second group of devices,
sending a request, from said receiver device, pertaining to a reference from said at least third device regarding said receiver device;
sending said reference to said sender device;
receiving, by said receiver device, an encrypted reference and an encrypted first public encryption key;
sending said encrypted first public encryption key to said at least one third device;
receiving a decrypted first public encryption key;
decrypting said encrypted reference; and
validating said decrypted reference, and
wherein said sender device is associated with a fourth device, said receiver device is associated with a fifth device and said fourth device is associated with said fifth device; and wherein in a case there does not exist at least one common third device in said first group and said second group of devices, said method further comprising:
sending a request pertaining to a reference from said fifth device regarding said receiver device; wherein said requesting is forwarded from said fourth device to said fifth device;
sending said reference to said fifth device;
receiving an encrypted reference and an encrypted first public encryption key;
sending said encrypted first public encryption key to said fourth device via said fifth device;
receiving said decrypted first public encryption key;
decrypting said encrypted reference; and
validating said decrypted reference.

* * * * *